(12) United States Patent
Martin et al.

(10) Patent No.: US 7,235,028 B2
(45) Date of Patent: Jun. 26, 2007

(54) THERMOPLASTIC JACKET BELT

(75) Inventors: Dieter Martin, Lakewood, CO (US);
Harry D. Visser, Lakewood, CO (US);
Paul N. Dunlap, Centennial, CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/121,556

(22) Filed: Apr. 12, 2002

(65) Prior Publication Data

US 2002/0187869 A1    Dec. 12, 2002

Related U.S. Application Data

(60) Provisional application No. 60/283,801, filed on Apr. 12, 2001.

(51) Int. Cl.
*F16G 1/06* (2006.01)

(52) U.S. Cl. ..................................... 474/264

(58) Field of Classification Search ............... 474/260, 474/265, 268, 271, 264
See application file for complete search history.

(56) References Cited

U.S. PATENT DOCUMENTS

| | | | |
|---|---|---|---|
| 3,843,476 A | 10/1974 | Kramer .................... 161/112 |
| 3,964,328 A * | 6/1976 | Redmond, Jr. ............... 474/205 |
| 4,144,111 A | 3/1979 | Schaerer .................... 156/187 |
| 4,538,022 A | 8/1985 | Barnicol-Ottler et al. ................. 174/113 R |
| 4,588,633 A * | 5/1986 | Kono et al. ................. 428/220 |
| 5,514,312 A | 5/1996 | Hardy et al. ............... 264/40.3 |
| 5,610,217 A | 3/1997 | Yarnell et al. ............. 524/397 |
| 5,653,656 A | 8/1997 | Thomas et al. ............. 474/205 |
| 5,779,028 A | 7/1998 | De Vries ..................... 198/847 |
| 5,971,879 A * | 10/1999 | Westhoff ..................... 474/260 |
| 6,296,588 B1 | 10/2001 | Ciemniecki et al. ........ 474/268 |
| 6,358,171 B1 * | 3/2002 | Whitfield .................... 474/266 |
| 6,443,866 B1 * | 9/2002 | Billups ........................ 474/260 |
| 6,770,004 B1 * | 8/2004 | Lofgren et al. ............. 474/266 |

FOREIGN PATENT DOCUMENTS

GB           1141029         1/1969

* cited by examiner

*Primary Examiner*—Vicky A. Johnson
(74) *Attorney, Agent, or Firm*—J. A. Thurnau, Esq.; C. H. Castleman, Esq.; J. L. Mahurin, Esq.

(57) ABSTRACT

A belt having a body, a tensile member and an outer surface. The body comprises an elastomer. An outer surface of the belt having a profile, foe example teeth. A layer of Ultra high molecular weight polyethylene thermoplastic (UHMWPE) is bonded to the profile surface. The layer bonded to the profile surface having a low softening point allowing it to conform to a mold shape prior to cure of the rubber body material. The layer having a molecular weight in the range of 3-7 million grams per mole. The layer causes the belt to exhibit superior abrasion resistance and flexibility while reducing the cost per belt as compared to fabric jacket belts. The UHMWPE jacket belt has significantly reduced dust and debris production during operation.

51 Claims, 3 Drawing Sheets

THERMOPLASTIC JACKET BELT

REFERENCE TO RELATED APPLICATIONS

This application claims priority from U.S. provisional application No. 60/283,801 filed Apr. 12, 2001.

FIELD OF THE INVENTION

The invention relates to power transmission belts, more particularly, the invention relates to belts having a jacket comprising an ultra high molecular weight polyethylene thermoplastic layer.

BACKGROUND OF THE INVENTION

Toothed power transmission belts have a polymeric body such as a rubber, thermoplastic, or urethane, with a plurality of teeth or cogs formed along at least one side or both sides of such belts. A tensile member is typically embedded in the body as a tensile load-carrying member.

It is preferred to have the belt teeth reinforced with a material to enhance their shear strength and wear-resistance, or to alter their coefficient of friction for engagement with a toothed pulley. The material generally comprises fabrics of a woven type such as a canvas, a crimped stretchable nylon, and a leno-weave, etc., and may be of a knit fabric such as a 1×1 rib knit. Such fabrics are disposed in the belt at a peripheral surface that includes the belt teeth and may be in the form of a single layer fabric, multiple layers of woven fabrics, or bonded layers of fabrics.

During operation, the fabric reinforcement wears creating dust and debris particles. The dust and debris is detrimental to the operation of adjacent components and may interfere with operation of certain types of equipment over time. For example, printers, copiers and cameras to name a few. Further, the dust and debris particles from the prior art belts may be electrically conductive, depending upon the belt materials. Depending upon the application, it is not desirable to have electrically conductive materials coating components in electrical equipment.

Belts are also taught with fabric jackets having an outer layering of impervious thermoplastic film. The film is used during the fabrication process to contain the belt body material with respect to an outer fabric reinforcement layer. The outer film layer has very poor abrasion resistance. Once in use, the film wears off exposing the fabric layer below.

Particularly relevant prior art is found in U.S. Pat. No. 3,964,328 (Redmond) which discloses a fabric in the preferable form of a stretchable nylon with a thermoplastic layer such as polyethylene bonded to an exterior surface thereof. The fabric is disposed at a peripheral surface of a belt including belt teeth as a wear-resistant fabric and friction modifying reinforcement. The thermoplastic surface has low abrasion resistance and wears away during operation.

What is needed is a belt having a film jacket comprising UHMWPE thermoplastic film. What is needed is a belt having a film jacket comprising UHMWPE thermoplastic film on a sprocket engaging surface. What is needed is a belt having a film jacket comprising UHMWPE thermoplastic film and having high abrasion resistance. The present invention meets these needs.

SUMMARY OF THE INVENTION

The primary aspect of the invention is to provide a belt having a film jacket comprising an ultra high molecular weight polyethylene thermoplastic film.

Another aspect of the invention is to provide a belt having a film jacket comprising an ultra high molecular weight polyethylene thermoplastic film on a sprocket engaging surface.

Another aspect of the present invention is to provide a belt having an ultra high molecular weight polyethylene thermoplastic film jacket having high abrasion resistance.

This and other aspects and advantages of the invention will be apparent after reviewing the drawings and detailed description thereof.

The invention comprises a belt having a body, a tensile member and an outer surface. The outer surface having belt teeth. Ultra high molecular weight polyethylene thermoplastic film (UHMWPE) is bonded to an outer load bearing surface. The outer surface comprises teeth in the preferred embodiment. The thermoplastic film bonded to the outer surface has a low softening point allowing it to comply with a mold shape prior to cure of the rubber body material. The UHMWPE film has a molecular weight in the range of 3-6 million grams per mole, although the range may be extended down to 250,000 grams per mole. The film exhibits superior abrasion resistance while reducing the cost per belt as compared to fabric jacket belts. The film jacket belt has significantly reduced dust and debris production during operation.

BRIEF DESCRIPTION OF THE DRAWINGS

Preferred aspects of this invention will be described with reference to the accompanying drawings, in which like numerals designate like parts in the several figures.

DESCRIPTION OF PREFERRED EMBODIMENT

Figure 1:
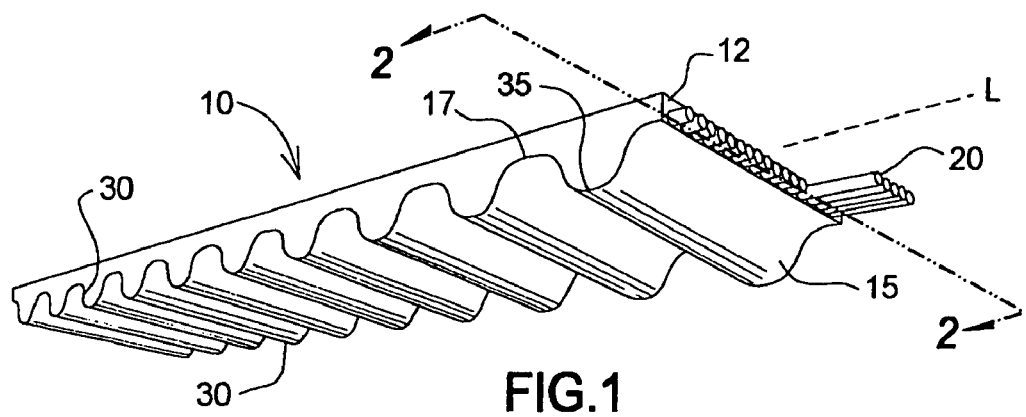
FIG. 1 is a perspective view of a film reinforced belt.

FIG. 1 is a perspective view of a thermoplastic jacket power transmission belt. The belt includes a body 10 having a top rubber 12. Top rubber 12 comprises a rubber stock or other elastomeric material as described herein. In the preferred embodiment the belt elastomeric comprises EPDM. Cogs or teeth 15 are arranged transversely along a longitudinal axis L of the belt 10. A land portion 17 is located between each set of adjacent cogs 15. Cogs 15 comprise an elastomeric or thermoplastic material compatible with or identical to the body 10 elastomeric material.

Tensile members 20, which run in the longitudinal direction of the belt, are loaded into the top rubber 12. Tensile members 20 bear a tensile load imposed upon the belt during operation. Elastomeric layer 21 extends between tensile members 20 and thermoplastic jacket 30. Layer 21 prevents the tensile members from chafing against jacket 30 during operation, thereby significantly extending the life of the belt.

Thermoplastic jacket 30 is bonded to the belt body on an outer surface 35 of the teeth 15 as described herein. As shown in FIG. 1, jacket 30 comprises an outermost layer which directly engages a sprocket.

Unlike the prior art, the jacket construction disclosed herein does not require an outer fabric layer on the tooth surface to reinforce the belt. Elimination of the fabric layer reduces the material and production cost per belt. The thermoplastic jacket belt construction disclosed herein is in the range of 18% to 24% less costly than a comparable belt having a fabric jacket, such as cotton, polyester, polyamide, hemp, jute, fiberglass, aramid or other natural and synthetic fibers known in the art.

In the preferred embodiment, jacket 30 comprises an ultra high molecular weight polyethylene (UHMWPE) thermoplastic film, for example, D/W 402™ by DeWal Industries, Inc. The UHMWPE film has a molecular weight in the range of 3 to 7 million grams per mole and an elongation percentage in the range of up to 375% of an original length. The density range for suitable polyethylene jacket materials is in the range of 0.93 to 0.95 grams/cc. The thermoplastic material for the jacket 30 may comprise a material that has a softening point temperature below the cure temperature of the rubber stock used for the belt body. The jacket may also comprise other polyethylene films known in the art, for example, BFI 2287 by Blueridge Films, Inc. The molecular weight of BFI 2287 is approximately 250,000 grams per mole with an elongation at break in the range of up to 500% of the original length. The jacket may also comprise blends and mixtures of other polyethylenes. An example of such a blend is a combination of UHMWPE particles in HDPE. An example of suitable UHMWPE particles is GUR 4150 from Ticona. GUR 4150 has a molecular weight in the range of 3 to 7 million grams per mole and a particle size of approximately 125 microns. It was found that a loading of as little as 30% by weight GUR4150 in BFI 2287 showed suitability as a jacket material. The use of UHMWPE significantly reduces the stiffness of the belt as compared to other thermoplastics in the same application.

The polyethylene films also comprise a low softening point generally less than a vulcanization temperature of the belt. The low softening point allows the thermoplastic film to soften and flow to conform to a mold shape before cross-linking of the rubber with the film is initiated during curing.

The polyethylene material may also have a softening temperature that is greater than a body cure temperature. In this embodiment the film is molded into a preformed shape, for example a toothed shape, before being incorporated into the belt build are described later herein.

Some rubber stocks have high adhesion values without the use of additional adhesive materials when bonded to certain thermoplastic films used for the jacket. For example, peroxide cured EPDM (ethylene-propylene-diene terpolymer) and peroxide cured nitrile have particularly good adhesion to untreated UHMWPE. This high adhesion is attributable to molecular entanglement of the very long chains of the UHMWPE within the crosslinked rubber chains that occurs during the rubber cure process.

Other rubber stocks, such as SBR, polychloroprene, natural rubber and isobutene isoprene rubbers are also known to have good adhesion to UHMWPE, and are acceptable materials for the rubber stock used with UHMWPE jackets. Rubber stocks are formulated to achieve a balance among various factors, including low cost, good processibility in mixing and calendaring, building tack, long scorch times and low modulus.

In the preferred embodiment no adhesives or primers are be needed to achieve good bonds between the thermoplastic films and the rubber stocks. In an alternate embodiment, an adhesive can be used to bond the UHMWPE to the rubber stocks. Adhesives for bonding the UHMW polyethylene jacket to the rubber body of the belt include those suitable for bonding of polyolefins. The preferred adhesives are solvent based adhesives made from modified polyolefin elastomers, such as chlorosulfonated polyethylene. An example of such an adhesive is Master Bond Polymer System X17™. Other lower performance, but also suitable, adhesives are solvent based elastomeric adhesives formulated from rubbers and certain resins, such as EPDM or nitrile rubber and alkylated phenol resins. An example of such an adhesive is Master Bond Polymer System X5™. Suitable solvents for the solvent based adhesives include acetone, xylene and methyl ethyl ketone. Bonding of the polyethylene jacket to the rubber body of the belt can also improved by oxidative treatments of the polyethylene surface, as well as other polyethylene pretreatments known in the art, such as solvent washing or vapor degreasing. Examples of oxidative treatments include exposure to corona discharge, flame oxidation, and plasma etching in an oxygen atmosphere.

The use of thermoplastic jackets does not limit the choice of belt tooth profiles. For example, standard trapezoidal, square and the many types of curvilinear shaped teeth known in the art are all compatible with a thermoplastic film jacket. Tooth pitch sizes may be in the range of 1 mm to 32 mm.

The jacket material may also be compounded with friction modifiers or conductive agents, for example graphite, waxes, oils, molybdenum disulfide, PTFE, mica talc, carbon black, and various blends of the above, to address uses for specific applications. The additives are used to modify the coefficient of friction or to achieve a desired conductivity. The applications may comprise uses where frictional characteristics impact system operation or where it is desirable for the belt to be conductive to dissipate static electrical charge.

The use of a thermoplastic jacket does not limit the selection of tensile members. All known tensile member materials are suitable. These comprise fiberglass, aramid, nylon, polyester, polyolefin, PBO, PEN, carbon, metal wire/cable, cotton, rayon, as well as other known tensile member materials. Nor does the use of a thermoplastic film jacket limit the construction, geometry and/or shape of the tensile member; single yarns, plied yarns, cabled cords, twisted cords, woven cords, woven fabrics, round & multilobal monofilaments, tapes, films and ribbons are all suitable.

Example belts were produced using peroxide cured EPDM. EPDM was selected for its good adhesion to the materials used as jackets.

Figure 2:
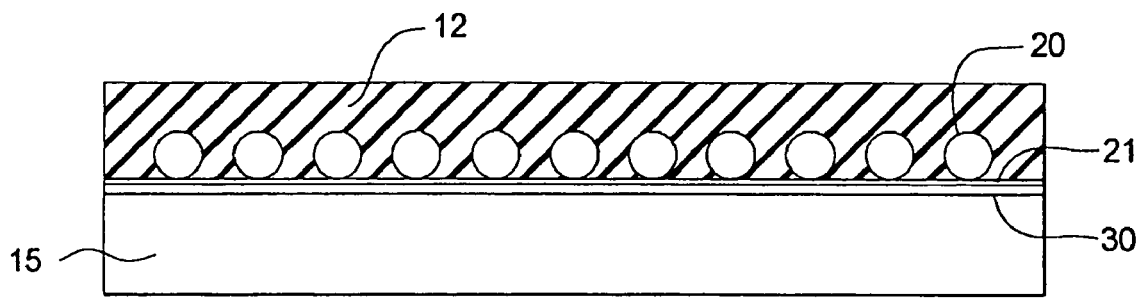
FIG. 2 is an enlarged cross section of film taken along the line 2-2 of FIG. 1.

FIG. 2 is an enlarged cross section of belt along the line 2-2 of FIG. 1. Tensile members 20 may or may not bear upon jacket 30 as required by a user.

Figure 3:
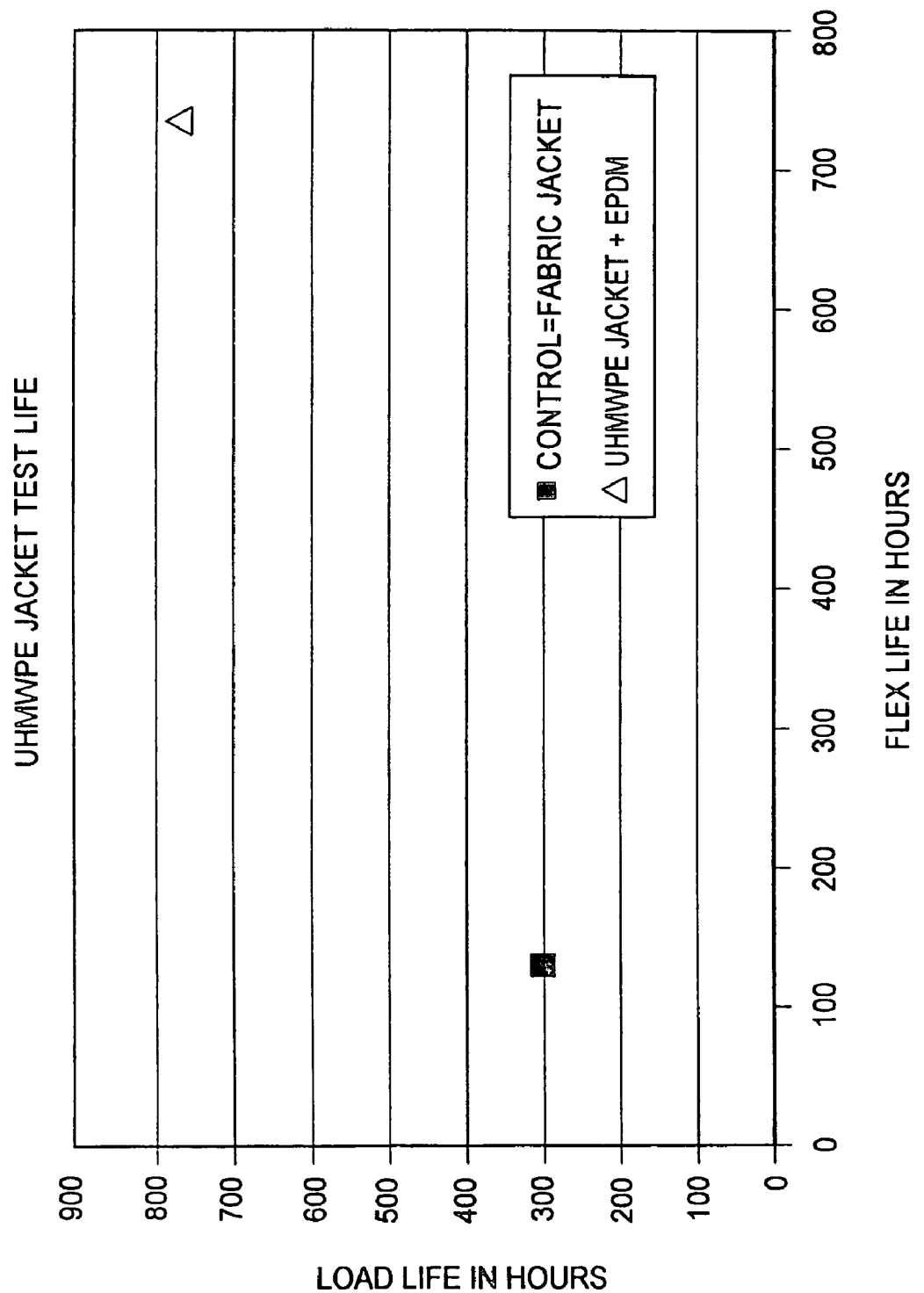
FIG. 3 is a chart depicting relative test lives for inventive belts compared to prior art fabric jacket belts.

FIG. 3 is a chart depicting relative test lives for inventive belts compared to prior art, nylon fabric jacket belts.

The flex test apparatus comprises a set of pulleys over which the belt is trained. Each belt is run at 3600 RPM on the two-point drive with 1201 Newtons (270 pounds) total tension at 22° C. Each sprocket has 22 grooves; each test belt has 120 teeth. The flex test is used to evaluate jacket wear. No torque is transmitted during the test.

For the load test the belt is run at 2500 RPM on a two-point drive with 1716 Newtons (385 pounds) total tension and a tension ratio of 3.5 (this is approximately 12 horsepower) at a temperature of 22° C. Each sprocket has 28 grooves; test belt has 120 teeth. Torque is transmitted during this test.

In particular, the UHMWPE belt shows an approximately 452% increase in flex life, from approximately 133 hours for the prior art nylon fabric jacket to approximately 735 hours for the inventive belt. Load life increased from 304 hours to 771 hours representing a 154% increase.

Figure 4:
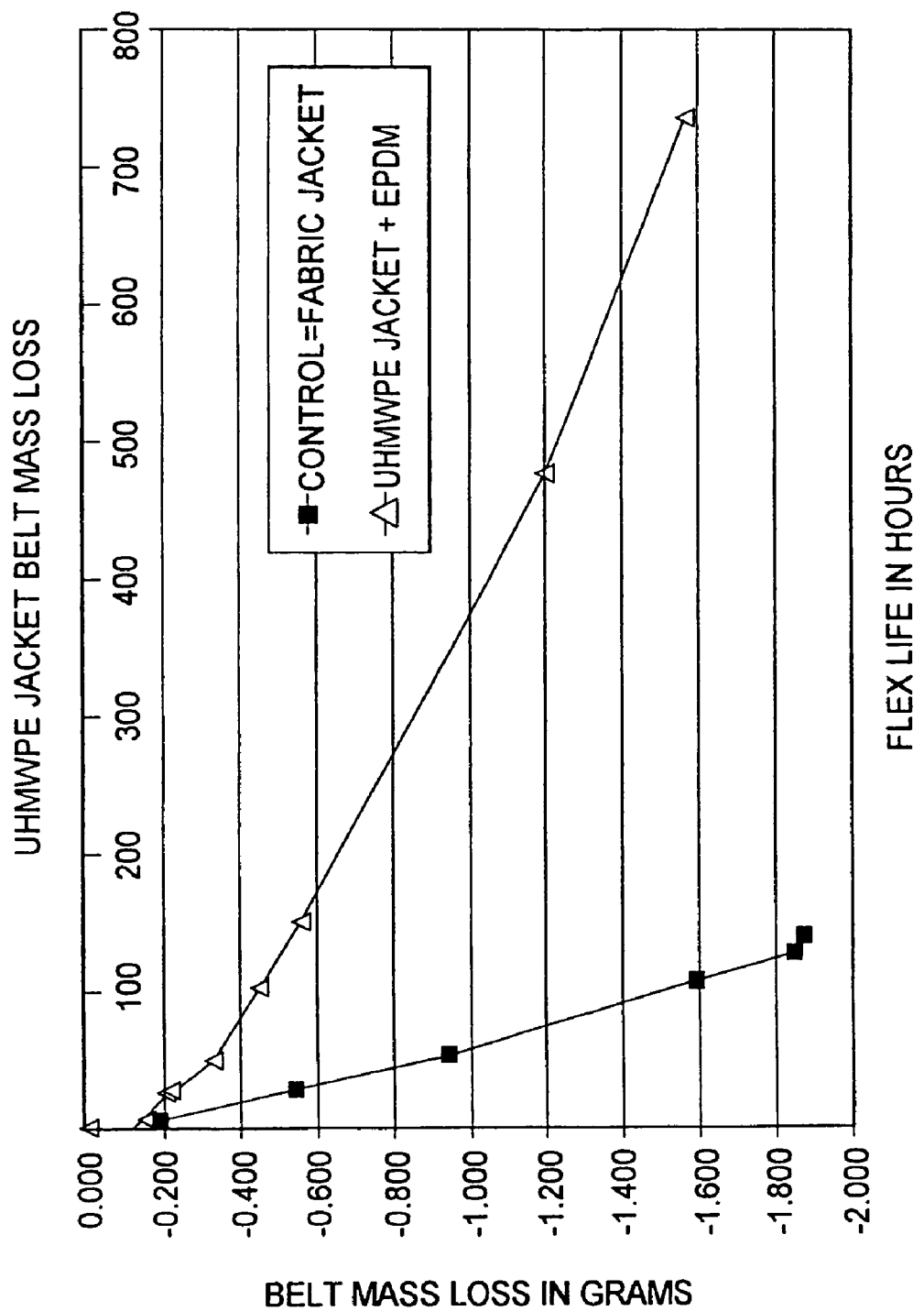
FIG. 4 is a chart depicting wear for the inventive belts compared to prior art fabric jacket belts.

FIG. 4 is a chart depicting mass loss for the inventive belts compared to prior art nylon fabric jacket belts. In particular, the UHMWPE belts shows mass loss equal to approximately ¼ of the mass loss for the prior art fabric belts for 100 hours on the flex tester. This illustrates the advantage of the inventive belts, particularly with respect to low wear rates and low mass loss during operation.

Method of Manufacture:

The belts are produced using the ply-up method using rolled sheets of thermoplastic material and calendered rubber. Curing the belt is accomplished in a steam vulcanizer. The mold has two main parts—an inside mandrel, which has the desired tooth profiles cut into its surface, and an outer shell, which contains a flexible bladder (cure bag) to transmit the pressure to the belt without allowing steam to contact the belt material.

The jacket is the first layer applied around the building mandrel. The jacket can be applied as several plies, or as one ply. More particularly, it may be applied in a single sheet or in a series of film layers built upon each other. Further, a preformed jacket already molded into a tooth profile may also be applied in lieu of the unmolded plies.

Figure 5:
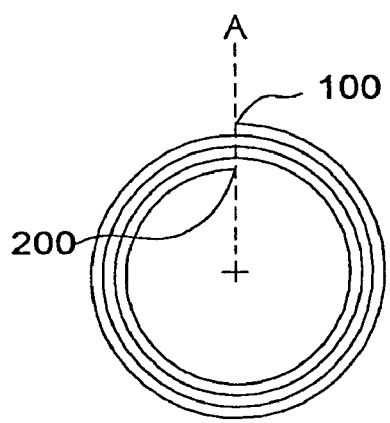
FIG. 5 is a cross-sectional view of wrapped plies of film.

FIG. 5 is a cross-sectional view of wrapped plies of film. In the case of several plies, the material is wrapped around the mandrel until the desired number of plies or thickness is achieved. The end of the wrap 100 can be held in place with a spot tack or adhesive. In the preferred embodiment, the end of the ply wrap is substantially aligned A-A with the leading edge 200 of the ply on the mandrel to avoid a thick spot in the layer once the belt is vulcanized. If one ply, the UHMWPE film can be butt spliced into a tube of the appropriate circumference and this tube is placed on the building mandrel before winding the cord. The splice may be accomplished using methods of thermoplastic welding such as use of a hot knife or hot plate, each known in the art.

The tensile members are next applied over the jacket material, followed by one or more plies of elastomeric or rubber stock. In order to improve belt flex and load life, a thin layer 21 of rubber is applied between the jacket film and the tensile cord. Layer 21 increases belt life by preventing chafing of the tensile member on jacket 30. The tensile member and rubber are applied using known methods used for production belts using fabric jackets. The mandrel, with the uncured belt build, is then placed inside the outer shell for curing.

As noted, the jacket 30 may be laid up in a single layer or ply, or as a laminate comprising a plurality of layers. The thickness of each layer is only limited by the availability of suitable thermoplastic film(s), but generally is in the range of 0.025 to 1.27 mm per layer. The total thickness of the jacket 30 may be in the range of 0.025 to 2.8 mm, depending upon the design and operational requirements placed upon the belt. This represents a jacket thickness to belt thickness ratio in the range of 25% to 35%. Operational requirements may include high MTBF (mean time between failures), or reduced dusting or debris production. The ranges are offered by way of example and not of limitation. Further, the laminating process may use any number of layers, in any thickness combination, to achieve the desired jacket thickness.

Once the belt is laid up on a mandrel and the mandrel is placed in the mold, a typical fabrication process comprises:

1) evacuating the air from inside the mold and holding for 1 to 5 minutes;

2) increasing the steam pressure on the outside shell to a range of 175 to 235 psig;

3) after 2 to 10 minutes, increasing the steam pressure on the inside of the mold to a range of 85 to 210 psig;

4) curing for 10 to 20 minutes;

5) decreasing the steam pressure inside the mold to atmospheric pressure;

6) decreasing the steam pressure outside the mold to atmospheric pressure;

7) quenching the mandrel in a cool fluid, such as water;

8) removing the cured belt blank from the mandrel.

The optimum tooth shapes are achieved with process pressures on the high end of the range.

Hydraulics or other methods known in the art (pneumatic, electrical) can also be used to apply pressure the belt, in conjunction with concurrently applied electric heat for curing in lieu of steam cure. The pressure range for a hydraulic cure is 85 to 500 psig. The temperature range is 250 to 500° F. This method of curing broadens the choice of films and rubber stocks.

Typical elastomeric formulations and film types for the belts are;

| Belt Elastomeric EPDM formulations | | | |
|---|---|---|---|
| | Parts PHR | | |
| | General | Preferred | |
| EPDM | 100-70 | Vistalon ™ 606 | 70 |
| EP Copolymer | 0-30 | Trilene ™ CP80 | 30 |
| Silica | 30-70 | HiSil ™ 190G | 50 |
| TiO$_2$ | 2-10 | TiO$_2$ | 4 |
| | | ZMTI | 1 |
| | | Navgard 455 | 1 |
| Antioxidant | 0.5-5.0 | Ethanox 702 | 0.5 |
| Lubricant | 1-5 | Zinc Stearate | 1.5 |
| Cure Activator | 2-10 | Zinc Oxide | 5 |
| Peroxide | 2-10 | Vulcup | 4 |
| Co-Agent | 0-20 | Saret ™ 708 | 15 |

| Belt Film | | | |
|---|---|---|---|
| Material | Tradename | Elongation | Molecular Weight Range |
| UHMWPE | D/W402 | 300% | 3 million-7 million g/mole |
| HMW-HDPE | BFI 2287 | 500% | 250,000 g/mole |
| GUR 4150 + BFI | 2287 (Blend) | 300-500% | 250,000 to 3 million g/mole |

The peak melt temperature for each is approximately: 132° C. for the D/W 402 and 128° C. for the BFI 2287. One skilled in the art can appreciate that polyethylene sheets or films having molecular weights in the range of 500,001 g/mole up to and including 2,999,999 g/mole also are applicable to the instant inventive belt.

Other alternate elastomeric formulations useful for the instant invention are disclosed in U.S. Pat. No. 5,610,217 to Yarnell et al. To form the elastomer composition of the present invention the ethylene-alpha-olefin elastomer may optionally be blended with less than 50% by weight, more preferably up to about 25%, and most preferably from about 5% to about 10% based on the total elastomeric content of the composition of a second elastomeric material including but not limited to silicone rubber, polychloroprene, epichlorohydrin, hydrogenated nitrile butadiene rubber, natural rubber, ethylene-vinyl-acetate copolymer, ethylene methacrylate copolymers and terpolymers, styrene butadiene rubber, nitrile rubber, chlorinated polyethylene, chlorosulfonated polyethylene, alkylated chlorosulfonated polyethylene, transpolyoctenamer, polyacrylic rubbers, butadiene rubber, and mixtures thereof, to fine-tune certain mechanical properties such as high temperature performance and tack.

The incorporation of metal salts of alpha-beta-unsaturated organic acids in the elastomeric compositions of the present invention may also be included. The metal salts of alpha-beta-unsaturated organic acids useful in the present invention are metal salts of acids such as, for example, acrylic, methacrylic, maleic, fumaric, ethacrylic, vinyl-acrylic, itaconic, methyl itaconic, aconitic, methyl aconitic, crotonic, alpha-methylcrotonic, cinnamic, and 2,4-dihydroxy cinnamic acids. These salts may be of zinc, cadmium, calcium, magnesium, sodium or aluminum, and are preferably those of zinc. The preferred metal salts of alpha-beta-unsaturated organic acids are zinc diacrylate and zinc dimethacrylate. Other co-agents may comprise, but are not limited to 1,4-butanediol diacrylate, 1,4-butanediol dimethylacrylate, tetraethylene glycol diacrylate, ethoxylated Bisphenol-A diacrylate, ethoxylated Bisphenol-A dimethacrylate, trimethyl propane triacrylate, timethyl propane trimethacrylate, glycerol triacrylate, glycerol trimethacrylate, trimethyl ethane triacrylate, propoxylated glycerol triacrylate, ethoxylated trimethylpropane triacrylate, pentaerythreltol tetraacrylate, pentaerythritol tetramethacrylate, di-trimethylolpropane tetraacrylate, ethoxylated pentaerythritol tetraacrylate, dipentaerythritol pentaacrylate, pentaacrylate ester, 1,2-polybutadiene, N,N'-m-phenylenebismaleimide.

The most preferred metal salt of unsaturated organic acid is zinc dimethacrylate. Amounts of the metal salt useful in the present invention may range from about 1 to about 30 phr, and are preferably from about 5 to about 20 phr. The metal salt is zinc dimethacrylate used in an amount of about 5 phr when used in conjunction with EPDM mixed with up to about 10% of silicone rubber, and from about 10 to about 20 phr and more preferably about 15 phr when used in conjunction with the other ethylene-alpha-olefin elastomers useful in the present invention.

The ethylene-alpha-olefin elastomeric compositions useful in the endless belts of the present invention further comprise from about 40 to 150 phr of a reinforcing filler such as carbon black, calcium carbonate, talc, clay or hydrated silica, or mixtures of the foregoing. The incorporation of from 1 to 30 phr of a metal salt of an unsaturated organic acid and from about 25 to about 250 phr and preferably about 25 to about 100 phr of reinforcing filler in the peroxide-cured ethylene-alpha-olefin elastomeric composition preserves the heat stability of conventional peroxide-cured elastomers, while providing the tear strength and dynamic properties usually associated with sulfur cured elastomers.

The free-radical producing curatives useful in the present invention are those suitable for curing ethylene-alpha-olefin elastomers and include for example, organic peroxides and ionizing radiation. The preferred curative is an organic peroxide, including but not limited to dicumyl peroxide, bis-(t-butyl peroxy-diisopropyl benzene, t-butyl perbenzoate, di-t-butyl peroxide, 2,5-dimethyl-2,5-di-t-butylperoxyhexane, alpha-alpha-bis (t-butylperoxy) diisopropylbenzene. The preferred organic peroxide curative is alpha-alpha-bis(t-butylperoxy) diisopropylbenzene. Cure-effective amounts of organic peroxide for purposes of the present invention are typically from about 2 to about 10 phr. Preferred levels of organic peroxide are from about 2 to about 10 phr. Sulfur may optionally be added to the organic peroxide curative as part of a mixed cure system in an amount of from about 0.01 to about 1.0 phr, to improve the cured elastomer's Young's modulus without negatively affecting its tear resistance.

Other conventional ethylene-alpha-olefin elastomer additives, process and extender oils, antioxidants, waxes, pigments, plasticizers, softeners and the like may be added according to common rubber processing practice without departing from the present invention. For example, in a preferred embodiment of the present invention, the elastomeric composition also contains from about 0.5 to about 5.0 phr of an antiozonant or antioxidant and from about 10 to about 50 phr of a paraffinic petroleum oil plasticizer/softener.

The ethylene-alpha-olefin elastomeric compositions useful in the present invention may be prepared by any conventional procedure such as for example, by mixing the ingredients in an internal mixer or on a mill.

In yet an alternate embodiment, the tensile members 20 are omitted from the belt 10. The jacket 30 is used to carry the tensile load experienced by the belt during operation. The method of construction is as described above, with the exception that the step including the tensile member is deleted. This alternate embodiment can produce belts for low power applications, such as printers.

During operation, although the inventive belt exhibits high abrasion resistance and low wear rates, a very slight amount of dust and debris particles may be created over time. If so, the dust and debris may settle on adjacent components, forming a thin layer of belt material. Further, it may not be possible or feasible to remove the dust layer due to physical or operational constraints, causing the dust layer to accumulate over time. Thermoplastic film has a relative dielectric constant or permittivity, $\epsilon$, in the range of approximately 2 to 3, which is appropriate to insulating solids. Since the film is a dielectric, any film dust created during operation is not electrically conductive, as compared to polysulfide belts that produce greater quantities of more conductive dust. Although the behavior of an insulator is time and frequency dependent, on balance, dielectric dust significantly diminishes or eliminates the potential for dust to interfere with or affect the operation of electronic components otherwise adversely affected by belt dust.

In yet another embodiment, jacket 30 comprises a polyamide or polyester thermoplastic film. The other belt components are as described in FIG. 1. Jacket 30 is connected to an outer surface 35 of body 10. Surface 35 extends in an endless direction on the belt. Teeth 15 are arranged transverse to an endless direction.

Various types of polyamide may be used for jacket 30. Examples include, but are not limited to, polyamide 6,6 exemplified by Dartek EN560™ by Enhance Packaging Technologies, polyamide 6 exemplified by Capran 100™ by Allied Signal, or polyamide 12 exemplified by Grilamid L25FVS10™ by EMS Chemie. Others include various copolymers such as polyether block amide exemplified by Pebax grades with peak melt temperatures ranging from 138° C. to 205° C. by Elf Atochem, or polyamide 46 exemplified by Stanyl™ by DSM. The jacket film material may also be compounded with friction modifiers, crystallinity modifiers, or conductive agents such as molybdenum disulfide, PTFE, graphite, and their equivalents.

The polyamide film must be flexible for the particular thickness used in the belt. Many grades of polyamide, being highly crystalline, must be used as very thin films, in the range of approximately 0.025 mm to 0.1 mm. Other less crystalline grades, being more flexible can be applied at greater thicknesses, up to approximately 3 mm. Greater thickness is desirable for greater wear resistance and load capability. Ultimately, the thickness used will depend on the design and operational requirements of the belt.

If a flow-through process is used, the grade of polyamide chosen should also have a softening point in substantially the same temperature range as the cure temperature of the elastomeric body of the belt. If the softening point is too high, the body will cure before the film is soft enough to flow and form the belt teeth. If the softening point is too low, an operational temperature of the belt will be reduced below a desirable level, for example, blow a temperature required for a satisfactory vehicle application. Polyamide films with melting temperatures up to 260° C. are successfully used in the flow through process. For some polyamide films melting in the 260 to 300° C. range, including polyamide 4,6, a preform process is preferable, wherein a jacket layer is preformed into a tooth shape prior to curing the belt. A flow-through process is one in which the rubber flows through the tensile cords and into the teeth during the cure process.

Consequently, the polyamide film embodiment comprises a higher softening point than that of the UHMWPE film described elsewhere in this specification. The elastomeric compounds described herein that are suitable for use with UHMWPE have been slightly modified for use with polyamide. The cure temperature and scorch time are raised to match the higher polyamide softening temperatures, as exemplified by the following. The following examples are offered by way of description and not of limitation. Other combinations, configurations utilizing the foregoing are possible. Each of the belts in the following examples exhibited excellent tooth formation, jacket adhesion and flexibility.

EXAMPLE 1

Nine layers of 3-mil (1.1 mm total thickness) Dartek EN560 polyamide 6,6 thermoplastic film layered together. The peak melt temperature is approximately 220° C. On top of the film layers is placed a 3 mm thick layer of EPDM, formulated as above except for 3.1 phr of Vanderbilt's Varox 130XL (2,5-dimethyl-2,5-di(t-butylperoxy)-3-hexyne) being substituted for the 4 phr of Vulcup. The peroxide raises the cure temperature of the belt body approximately 20° C., making it more suitable for use with the polyamide film. The materials and mold are placed in a mold under a pressure of 250 psi. The mold is brought to a temperature of approximately 210° C. to soften the film, form the teeth, and cure the body. Then the mold is cooled to 175° C. while maintaining pressure of 250 psi before removal. Cooling is performed to resolidify the thermoplastic film for better tooth shape retention. This is necessary with crystalline thermoplastic materials that have very sharp melting points and low melt viscosity.

EXAMPLE 2

Eleven layers of 2.1-mil (0.9 mm total thickness) Dartek SF502 polyamide 6,6 thermoplastic film, having a peak melt temperature of 260° C., are placed in a mold with the modified EPDM body rubber as in Example 1. The materials and mold are placed in a bag mold under a pressure of 200 psi. The mold is brought to a temperature of approximately 240° C. as quickly as possible (about 8 minutes) to soften the film, form the teeth, and cure the body. Rapid heating is required to obtain good tooth formation before the body cures. Then the mold is cooled to 200° C. under pressure before the belt is removed. The resulting belt exhibits excellent tooth formation and adhesion, but with limited flexibility because of the brittleness of this polyamide film. It is expected that a total film thickness of 0.1 to 0.2 mm for this polyamide film would make a sufficiently flexible belt.

EXAMPLE 3

Twenty layers of 1-mil (1.2 mm total thickness) Capran 100 polyamide 6 thermoplastic film, having a peak melt temperature of 220° C., were placed in the mold with the body rubber as in Example 1 and 2. The materials and mold are placed in a bag mold under a pressure of 250 psi. The mold is brought to a temperature of approximately 210° C. to soften the film, form the teeth, and cure the body. Then the mold is cooled to 175° C. under pressure (250 psi) before removal.

EXAMPLE 4

Three layers of 10-mil (1.2 mm total thickness) Grilamid L25FVS10 polyamide 1,2 thermoplastic film, having a peak melt temperature of 174° C., were placed in the mold as in Examples 1, 2 and 3, but with a body rubber based on HNBR. The rubber in this Example uses the same peroxide cure system as the EPDM in Examples 1 and 2. The materials are molded in a bag mold under a pressure of 250 psi. The mold is brought to a temperature of approximately 180° C. to soften the film, form the teeth, and cure the body. The mold is then cooled to 150° C. under full pressure (250 psi) before removal.

EXAMPLE 5

Five layers of 5-mil (1 mm total thickness) Pebax 7033™ polyether block amide thermoplastic film, having a peak melt temperature of 170° C., are molded with the body rubber as in Example 4. The materials and mold are placed in a bag mold under a pressure of 250 psi. The mold was brought to a temperature of approximately 181° C. to soften the film, form the teeth, and cure the body. The mold is then cooled to 140° C. under full pressure (250 psi) before the belt is removed.

In yet another embodiment, jacket 30 comprises a polyester thermoplastic film. Various types of polyester may be used. Examples include, but are not limited to, the polyester copolymers Hytrel™ by DuPont and Arnitel™ by DSM. Polyester thermoplastic films are available in a range of grades with peak melt temperatures ranging from approximately 148° C. to 219° C. Polyester films make very flexible and durable belt jackets.

EXAMPLE 6

Six layers of 5-mil (1.2 mm total thickness) Hytrel T 4056 copolyester thermoplastic film, having a peak melt temperature of approximately 150° C., are molded with the HNBR body rubber as in Examples 4 and 5, but modified by substituting Vulcup for Varox 130XL for curing at a lower temperature. The materials and mold are placed in a bag mold under a pressure of 250 psi. The mold is brought to a temperature of approximately 156° C. to soften the film, form the teeth, and cure the body. Then the mold is cooled to 100° C. under full pressure (250 psi) before the belt is removed.

The HNBR formulation used in Examples 4-6 is as follows:

| | |
|---|---|
| Therban C3467 (Bayer) | 100 |
| Carbon Black | 5 |
| Zinc Oxide | 10 |
| Stearic Acid | 2 |
| Plasticizer | 5 |
| Zinc Diacrylate (Sartomer) | 39 |
| Antioxidants | 4 |
| sulfur and accelerators | 2.25 |
| Varox 130XL (Vanderbilt) | 9 |

It should be understood that the invention is capable of a variety of modifications and variations that will become apparent to those skilled in the art upon a reading of this specification. Such modifications and variations and equivalents are intended to be a part of the scope of the invention as defined by the appended claims.

We claim:

1. A belt comprising:
   a body comprising an elastomeric material;
   a tensile member longitudinally disposed along the length of said body;
   a plurality of teeth disposed along said body having a surface, said teeth arranged transversely to a longitudinal length of said body;
   an outermost ultra high molecular weight polyethylene layer having a thickness in the range of greater than 0.052 mm to approximately 2.8 mm bonded to said surface of said teeth;
   the ultra high molecular weight polyethylene layer comprises a molecular weight in the range of 3,000,000 to 7,000,000 grams/mole;
   the ultra high molecular weight polyethylene layer comprises a friction modifier; and
   a layer of elastomeric material between said tensile member and said ultra high molecular weight polyethylene layer.

2. The belt as in claim 1, wherein a peak melt temperature for the ultra high molecular weight polyethylene layer is approximately 128° to 132° C.

3. The belt as in claim 2, wherein a thickness of the ultra high molecular weight polyethylene layer is in the range of 0.025 to 3.0 mm.

4. The belt as. in claim 3, wherein the ultra high molecular weight polyethylene comprises a softening temperature that is less than a body cure temperature.

5. The belt as in claim 4 further comprising an adhesive for bonding said ultra high molecular weight polyethylene layer to said body, wherein the adhesive comprises a solvent based adhesive made from modified polyolefin elastomers.

6. The belt as in claim 3, wherein:
   the ultra high molecular weight polyethylene layer comprises a softening temperature that is greater than a body cure temperature; and
   a preformed shape describing teeth.

7. The belt as in claim 6 further comprising an adhesive for bonding said ultra high molecular weight polyethylene layer to said body, wherein the adhesive comprises solvent based adhesive made from modified polyolefin elastomers.

8. The belt as in claim 6, wherein:
   the elastomeric material comprises EPDM rubber; and
   said EPDM rubber comprises 2%-10% peroxide.

9. The belt as in claim 1, wherein the friction modifier is selected from the group comprising graphite, waxes, oils, molybdenum disulfide, PTFE, mica talc, carbon black, and blends of two or more of the above.

10. The belt as in claim 1 wherein the tensile member is selected from the group comprising fiberglass, aramid, nylon, polyester, polyolefin, PBO PEN, carbon, metal wire/cable, cotton and rayon and blends of two or more of the above.

11. The belt as in claim 1 wherein the elastomeric material is selected from the group comprising peroxide cured EPDM, peroxide cured nitrile, SBR, polychloroprene, natural rubber, isobutene isoprene rubbers and blends of two or more of the above.

12. The belt as in claim 11 wherein the elastomeric material further comprises metal salts selected from the group comprising acrylic acid, methacrylic acid, maleic acid, fumaric acid, ethacrylic acid, vinyl-acrylic acid, itaconic acid, methyl itaconic acid, aconitic acid, methyl aconitic acid, crotonic acid, alpha-methylcrotonic acid, cinnamic acid, 2,4-dihydroxy cinnamic acid, salts of zinc, salts of cadmium, salts of calcium, salts of magnesium, salts of sodium, slats of aluminum, zinc diacrylate, zinc dimethacrylate, 1,4-butanediol diacrylate, 1,4-butanediol dimethyacrylate, tetraethylene glycol, diacrylate, ethoxylated Bisphenol-A diacrylate, ethoxylated Bisphenol-A dimethacrylate, trimethyl propane triacrylate, timethyl propane trimethacrylate, glycerol triacrylate, glycerol trimethacrylate, trimethyl ethane triacrylate, proporylated glycerol triacrylate, ethoxylated trimethylpropane triacrylate, pentaerythreltol tetraacrylate, pentaerythritol tetramethacrylate, di-trimethylolpropane tetraacrylate, ethoxylated pentaerythritol tetraacrylate, dipentaerythritol pentaacrylate, pentaacrylate ester, 1,2-polybutadiene, N,N'-m-phenylenebismaleimide and blends of two or more of the above.

13. In an endless belt comprising an elastomeric body portion, a tensile member disposed longitudinally within the body portion, and a plurality of spaced teeth having an outer surface and disposed along the body, the improvement comprising:
   an outermost layer of ultra high molecular weight polyethylene having a thickness in the range of greater than 0.052 mm to approximately 2.8 mm and bonded to the outer surface of said teeth; and
   the ultra high molecular weight polyethylene comprises a friction modifier.

14. The belt as in claim 13 wherein the ultra high molecular weight polyethylene further comprises: a molecular weight in the range of 3,000,000 to 7,000,000 grams/mole.

15. The belt as in claim 14, wherein the ultra high molecular weight polyethylene comprises a softening temperature that is less than a body cure temperature.

16. The belt as in claim 13 wherein the ultra high molecular weight polyethylene layer further comprises:
   a molecular weight in the range of 250,000 to 3,000,000 grams/mole.

17. A belt comprising;
   a body comprising an elastomeric material;
   a tensile member longitudinally disposed along a length of said body;
   a plurality of teeth disposed along a longitudinal length of said body, said teeth arranged transversely to a longitudinal length of said body;
   an outermost thermoplastic layer comprising polyamide and having a thickness bonded to an outer surface of said teeth;

the polyamide layet further comprises a friction modifier and a layer of elastomeric material disposed between said tensile member and said thermoplastic layer.

18. The belt as in claim 17, wherein a peak melt temperature for the thermoplastic layer is in the range of approximately 150° to 300° C.

19. The belt as in claim 18, wherein a thickness of the thermoplastic layer is in the range of approximately 0.025 mm to 3 mm.

20. The belt as in claim 17, wherein the thermoplastic layer substantially comprises polyamide 6,6.

21. The belt as in claim 17, wherein the thermoplastic layer substantially comprises polyamide 12.

22. The belt as in claim 17, wherein the thermoplastic layer substantially comprises polyamide 4,6.

23. The belt as in claim 17, wherein the friction modifier is selected from the group comprising graphite, waxes, oils, molybdenum disulfide, PTFE, mica talc, carbon black, and blends of two or more of the above.

24. The belt as in claim 17 wherein the tensile member is selected from the group comprising fiberglass, aramid, nylon, polyester, polyolefin, PBO, PEN, carbon, metal wire/cable, cotton and rayon and blends of two or more of the above.

25. The belt as in claim 17 wherein the elastomeric material is selected from the group comprising peroxide cured EPDM, peroxide cured nttrile, SBR, polychlorprene, natural rubber, isobutenne isoprene rubbers and blends of two or more of the above.

26. The belt as in claim 17 further comprising a plurality of thermoplastic layers.

27. A belt comprising:
a body comprising an elastomeric material;
a tensile member embedded in said body in an endless direction;
an outer surface disposed along the body in an endless direction;
an outermost thermoplastic layer comprising polyamide directly engagable with a sprocket having a thickness bonded to said surface;
the polyamide layer further comprises a friction modifier; and
a layer of elastomeric material disposed between said tensile member and said surface.

28. The belt as in claim 27, wherein a peak melt temperature for the thermoplastic layer is in the range of approximately 174° to 260° C.

29. The belt as in claim 28, wherein a thickness of the thermoplastic layer is in the range of approximately 0.025 mm to 3 mm.

30. The belt as in claim 29, wherein the surface comprises a plurality of teeth disposed transverse to an endless direction.

31. The belt as in claim 27, wherein a thickness of the thermoplastic layer is in the range of approximately 0.025 mm to 3.0 mm.

32. The belt as in claim 31, wherein the surface comprises teeth disposed transverse to an endless direction.

33. The belt as in claim 27, wherein the friction modifier is selected from the group comprising graphite, waxes, oils, molybdenum disulfide, PTFE, mica talc, carbon black, and blends of two or more of the above.

34. The belt as in claim 27 wherein the tensile member is selected from the group comprising fiberglass, aramid, nylon, polyester, polyolefin, PBO, PEN, carbon, metal wire/cable, cotton and rayon and blends of two or more of the above.

35. The belt as in claim 27 wherein the elastomeric material is selected from the group comprising peroxide cured EPDM, peroxide cared nitrile, SBR, polychloroprene, natural rubber, isobutene isoprene rubbers and blends of two or more of the above.

36. The belt as in claim 27 further comprising a plurality of thermoplastic layers.

37. A belt comprising
a body comprising an elastomeric material;
a tensile member longitudinally disposed along the length of said body;
a plurality of teeth disposed along said body having a surface, said teeth arranged transversely to a longitudinal length of said body; and
a polyethylene layer directly engagable with a sprocket having a thickness in the range of greater than 0.052 mm to approximately 2.8 mm bonded to said surface, the polyethylene layer having a molecular weight in the range of approximately 3,000,000 to 7,000,000 grams/mole;
the polyethylene layer comprises a softening temperature that is greater than a body cure temperature; and
a preformed shape describing teeth.

38. The belt as in claim 37, wherein the belt further comprises a layer of elastomeric material disposed between said tensile member and said polyethylene layer.

39. The belt as in claim 37, wherein a peak melt temperature for the polyethylene layer is in the range of approximately 128° to 132° C.

40. The belt as in claim 37, wherein a thickness of the polyethylene layer is in the range of approximately 0.025 mm to 3.0 mm.

41. The belt as in claim 37 further comprising an adhesive for bonding said polyethylene layer to said body, wherein the adhesive comprises a solvent based adhesive made from modified polyolefin in elastomers.

42. The belt as in claim 37, wherein:
the elastomeric material comprises EPDM rubber; and
said EPDM rubber comprises 2%-10% peroxide.

43. The belt as in claim 37, wherein the ultra high molecular weight polyethylene layer further comprises a friction modifier.

44. The belt as in claim 43, wherein the friction modifier is selected from the group comprising graphite, waxes, oils, molybdenum disulfide, PTFE, mica talc, carbon black, and blends of two or more of the above.

45. The belt as in claim 37 wherein the tensile member is selected from the group comprising fiberglass, aramid, nylon, polyester, polyolefin, PBO, PEN, carbon, metal wire/cable, cotton and rayon and blends of two or more of the above.

46. The belt as in claim 37 wherein the elastomeric material is selected from the group comprising peroxide cured EPDM, peroxide cured nitrile, SBR, polychloroprene, natural rubber, isobutene isoprene rubbers and blends of two or more of the above.

47. A belt comprising:
a body comprising an elastomeric material;
a plurality of teeth disposed along said body having a first surface for engaging a sprocket, said teeth arranged transversely to a longitudinal length of said. body and having a pitch; and an outermost ultra high molecular weight polyethylene layer having a thickness in the range of greater than 0.052 mm to approximately 2.8 mm bonded to said first surface of said teeth the ultra high molecular weight polyethylene layer further comprises a molecular weight in the range of 3,000,000 to 7,000,000 grams/mole; and the ultra high molecular weight polyethylene layer further comprises a friction modifier.

48. The belt as in claim 47, wherein a peak melt temperature for the ultra high molecular weight polyethylene layer is approximately 128° to 132° C.

49. The belt as in claim 47, wherein the friction modifier is selected from the group comprising graphite, waxes, oils, molybdenum disulfide, PTFE, mica talc, carbon black, and blends of two or more of the above.

50. The belt as in claim 47 wherein the elastomeric material is selected from the group comprising peroxide cured EPDM, peroxide cured nitrile, SBR, polychloroprene, natural rubber, isobutene isoprene rubbers and blends of two or more of the above.

51. A belt comprising:

a body comprising an elastomeric material;

a tensile member longitudinally disposed along the length of said body;

a plurality of teeth disposed along said body having a surface, said teeth arranged transversely to a longitudinal length of said body; and a polyethylene layer directly engagable with a sprocket having a thickness in the range of greater than 0.052 mm to approximately 2.8 mm bonded to said surface, the polyethylene layer having a molecular weight in the range of approximately 3,000,000 tO 7,000,000 grams/ mole;

the polyethylene layer comprises a softening temperature that is less than a body cure temperature; and a preformed shape describing teeth.

\* \* \* \* \*